(12) United States Patent
Rossi et al.

(10) Patent No.: US 12,157,520 B2
(45) Date of Patent: Dec. 3, 2024

(54) TIRE HOIST SYSTEM

(71) Applicant: VENTRA GROUP, CO., Halifax (CA)

(72) Inventors: Tim Rossi, Bolton (CA); Joaquin Hung, Markham (CA)

(73) Assignee: VENTRA GROUP CO., Halifax (CA)

( * ) Notice: Subject to any disclaimer, the term of this patent is extended or adjusted under 35 U.S.C. 154(b) by 267 days.

(21) Appl. No.: 17/948,708

(22) Filed: Sep. 20, 2022

(65) Prior Publication Data
US 2023/0091322 A1 Mar. 23, 2023

Related U.S. Application Data

(60) Provisional application No. 63/246,456, filed on Sep. 21, 2021.

(51) Int. Cl.
*B62D 43/04* (2006.01)
*B62D 65/00* (2006.01)

(52) U.S. Cl.
CPC ........... *B62D 43/045* (2013.01); *B62D 65/00* (2013.01)

(58) Field of Classification Search
CPC ........... B62D 43/045; B66D 1/04; B66D 1/00
USPC .............................. 224/42.23–42.24; 414/463
See application file for complete search history.

(56) References Cited

U.S. PATENT DOCUMENTS

| | | | | |
|---|---|---|---|---|
| 2,661,130 A | * | 12/1953 | Evans | B62D 43/045 414/463 |
| 4,915,358 A | * | 4/1990 | Stallings | B66D 1/04 254/323 |
| 5,910,060 A | * | 6/1999 | Blume | B60K 17/16 475/221 |
| 7,226,039 B2 | * | 6/2007 | Sauner | B66D 3/18 254/323 |
| 2014/0072394 A1 | | 3/2014 | Rossi et al. | |
| 2014/0271067 A1 | | 9/2014 | Rossi et al. | |

* cited by examiner

*Primary Examiner* — Adam J Waggenspack
(74) *Attorney, Agent, or Firm* — Pillsbury Winthrop Shaw Pittman, LLP (57) ABSTRACT

A tire hoist system mounted beneath a vehicle body and supporting a spare tire for raising and lowering. The tire hoist system comprises a take-up reel rotatable about a reel axis; a flexible support member; and a tire support for a spare tire. The flexible support member is coupled to the take-up reel. A reduction gear system includes a plurality of meshed gears, including a reduction input gear. An input gear system has (a) an output gear coupled to the reduction input gear of the reduction gear system such that rotation of the output gear drives the reduction input gear, (b) a driving input gear meshed with the output gear, and (c) an input element fixed with the driving input gear and engageable by a drive tool. The output gear is rotated about an output axis parallel or coincident with the reel axis and the input element and the driving input gear is rotatable about an input axis oriented at an angle to the reel axis. The input gear system is an adapter input gear system comprising an input gear system housing, and is assembled separately from the reduction gear system and mounted by the input gear system housing being mounted to an exterior surface of the reduction gear system housing. A method for adapting a tire hoist system is also disclosed.

11 Claims, 9 Drawing Sheets

TIRE HOIST SYSTEM

CROSS-REFERENCE TO RELATED APPLICATIONS

This application claims priority to U.S. Provisional Application No. 63/246,456, filed Sep. 21, 2021, the subject matter of which is incorporated herein by reference in its entirety.

FIELD OF THE INVENTION

The present invention relates to a tire hoist system for mounting beneath a vehicle body and supporting a spare tire for raising and lowering.

BACKGROUND

Figure 1A:
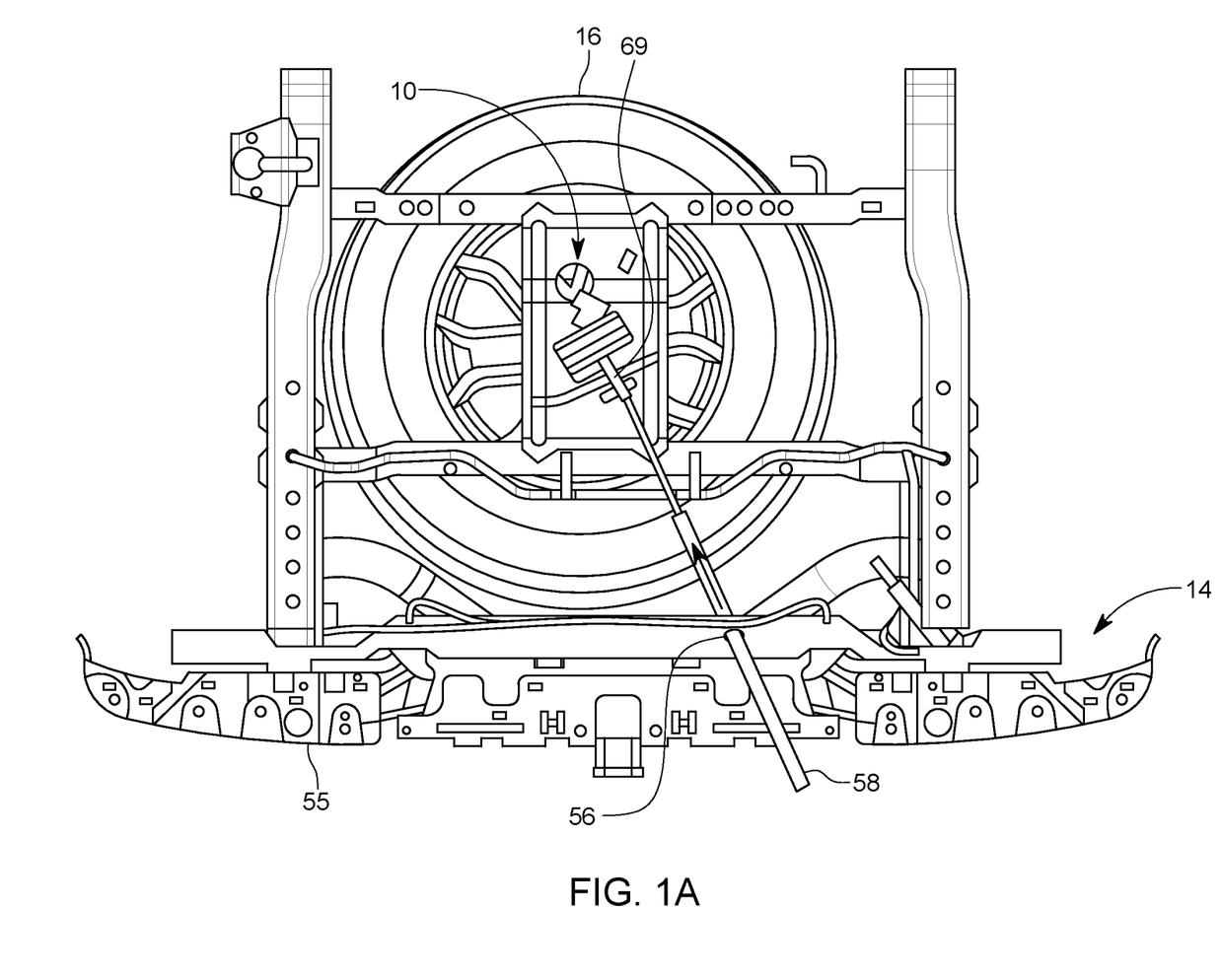
FIG. 1a is a top plan view of a prior art tire hoist system mounted underneath a vehicle, the vehicle being only partially shown to focus on the hoist system location, mounting, and the spare tire.
Figure 1B:
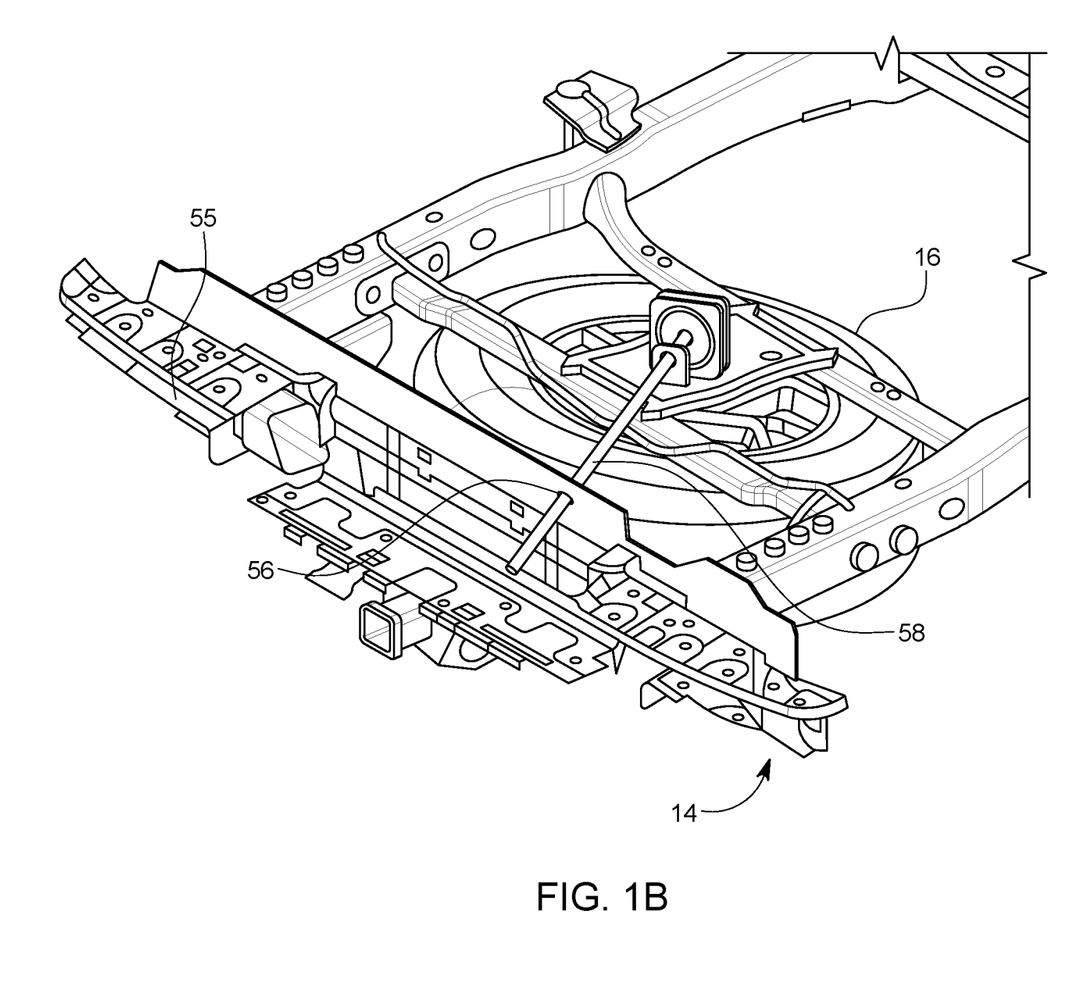

Tire hoist systems are commonly mounted under vehicle bodies. FIG. 1 discloses an example 10, which is also disclosed in U.S. Provisional Application Ser. No. 63/178,127, the entirety of which is incorporated herein. Such systems are used for storing a spare tire (a/k/a a spare wheel) 16 underneath the vehicle body, rather than including a spare tire compartment inside the vehicle. This is typical of pick-up trucks, which have limited spaced in the cab area. This is also typical in other vehicles as well, particularly for increasing interior cargo space (rather than allocating some of the internal space to a spare tire).

Due to their location, tire hoist systems are subject to various space or packaging constraints. For example, there are numerous components found under the vehicle body, and the tire hoist system needs to be in a location that avoids interference with those components. This issue may grow more rapidly with fully electric or partially electric/hybrid (PHEV) vehicles, as those may involve the use of more electric motors and components distributed throughout the vehicle, and even batteries themselves may be packaged under the vehicle to take advantage of available space and increase overall electric capacity.

Moreover, tire hoist systems are typically manually driven by an elongated tool 58 that is inserted through an access opening 56 on the vehicle body (see FIG. 1). This enables rotation of the tool 58 by the user to input torque to drive the hoist system 10. The hoist system 10 includes a reduction gear system 24 for increasing the torque, and the hoist system 10 takes up or pays out a flexible support member (typically a cable or chain) to raise or lower the spare tire 16. Often the access opening 56 is formed in the vehicle bumper (the internal structure of which is shown at 55), but in some vehicles it may be formed in the passenger compartment floor. The elongated tool 58 is typically formed of 2-3 tubular members connected axially together, which may also be the same tools used to operate the vehicle jack or part of the same tool set. The use of a longer tool is particularly the case for vehicle designs where the access opening 56 is on the bumper 55, and the location for the spare tire 16 and its hoist 10 is located further forward. In some designs, a guide or "funnel" may be used to help guide the tool 58 in alignment with the input element 69 of the hoist system 10. In some other designs, part of the tool remains installed, i.e., it is connected to the drive input 69 of the hoist system and extends toward the access opening 56. Thus, the user only needs to insert a shorter tool component to engage the installed part for driving the hoist system drive input 69. Any approach requires the vehicle packaging design to have a clean (i.e., unobstructed) tool path between the access opening 56 and the tire hoist system 10 for the user to insert the tool 58 through the access opening 56 for driving engagement with an input element 69 on the hoist system 10.

The need for a clean tool path also introduces further complexity into the vehicle design because the path needs to be clear of other vehicle components. Moreover, the tool path location in turn can also constrain the location of the tire hoist system, as well as its design and orientation. And conversely, the location, design and orientation of the tire hoist system can also constrain the location of the tool path. In other words, these issues are competing ones, further complicated by the competing demand on vehicle space from other components on its underside.

SUMMARY OF THE INVENTION

The present inventor(s) have sought to reduce some for the vehicle design complexity concerns related to the location, design and installation of the tire hoist system and its tool path by providing a tire hoist system with improved flexibility in terms of the relation between the tool path/access opening and the tire hoist system.

One aspect of the present invention provides a tire hoist system for mounting beneath a vehicle body and supporting a spare tire for raising and lowering. The tire hoist system comprises a take-up reel rotatable about a reel axis; a flexible support member; and a tire support coupled to a free end of the flexible support member and configured to support a spare tire. The flexible support member is coupled to the take-up reel such that rotation of the take-up reel in a lowering direction pays out the flexible support member for lowering the spare tire when supported thereon and rotation of the take-up reel in a raising direction winds the flexible support member onto the take-up reel for raising the spare tire when supported thereon. A reduction gear system is coupled to the take-up reel. The reduction gear system includes a plurality of meshed gears. The plurality of meshed gears includes a reduction input gear and is configured to apply a torque to the take-up reel that is higher than a torque applied to the reduction input gear.

An input gear system has (a) an output gear coupled to the reduction input gear of the reduction gear system such that rotation of the output gear drives the reduction input gear, (b) a driving input gear meshed with the output gear such that rotation thereof drives the output gear, and (c) an input element fixed with the driving input gear and engageable by a drive tool for rotating the driving input gear of the input gear system. The output gear is rotated about an output axis parallel or coincident with the reel axis and the input element and the driving input gear is rotatable about an input axis oriented at an angle to the reel axis. The reduction gear system includes a reduction gear system housing and the input gear system is an adapter input gear system comprising an input gear system housing in which the driving input and output gears thereof are rotatably mounted. The input gear system is assembled separately from the reduction gear system and mounted by the input gear system housing being mounted to an exterior surface of the reduction gear system housing.

Another aspect of the invention provides a method of adapting a tire hoist system for mounting beneath a vehicle body and supporting a spare tire for raising and lowering. The tire hoist system comprises a take-up reel rotatable about a reel axis; a flexible support member; and a tire support coupled to a free end of the flexible support member and configured to support a spare tire. The flexible support member is coupled to the take-up reel such that rotation of the take-up reel in a lowering direction pays out the flexible support member for lowering the spare tire when supported thereon and rotation of the take-up reel in a raising direction winds the flexible support member onto the take-up reel for raising the spare tire when supported thereon. A reduction gear system is coupled to the take-up reel, and includes a plurality of meshed gears. The plurality of meshed gears includes a reduction input gear and is configured to apply a torque to the take-up reel that is higher than a torque applied to the reduction input gear. The reduction gear system includes a reduction gear system housing. The method comprises:

provind an adapter input gear system having (a) an output gear for coupling to the reduction input gear of the reduction gear system such that rotation of the output gear drives the reduction input gear, (b) a driving input gear meshed with the output gear such that rotation thereof drives the output gear, (c) an input element fixed with the driving input gear and engageable by a drive tool for rotating the driving input gear of the input gear system, and (d) an input gear system housing in which the driving input and output gears thereof are rotatably mounted, wherein the output gear is rotatable about an output axis and the input element and the driving input gear are rotatable about an input axis oriented at an angle to the output axis; and mounting the input gear system housing to an exterior surface of the reduction gear system housing to couple the output gear to the reduction input gear such that the output axis of the output gear is parallel or coincident with the reel axis and the input axis of the input element and the driving input gear are oriented at the angle to the reel axis.

Other objects, aspects and advantages of the present invention will become apparent from the following detailed description, the accompanying drawings, and the appended claims.

BRIEF DESCRIPTION OF THE FIGURES

FIG. 1b is a perspective of view of the system illustrated in FIG. 1a;

DETAILED DESCRIPTION OF EXAMPLE EMBODIMENT(S)

Figure 2:
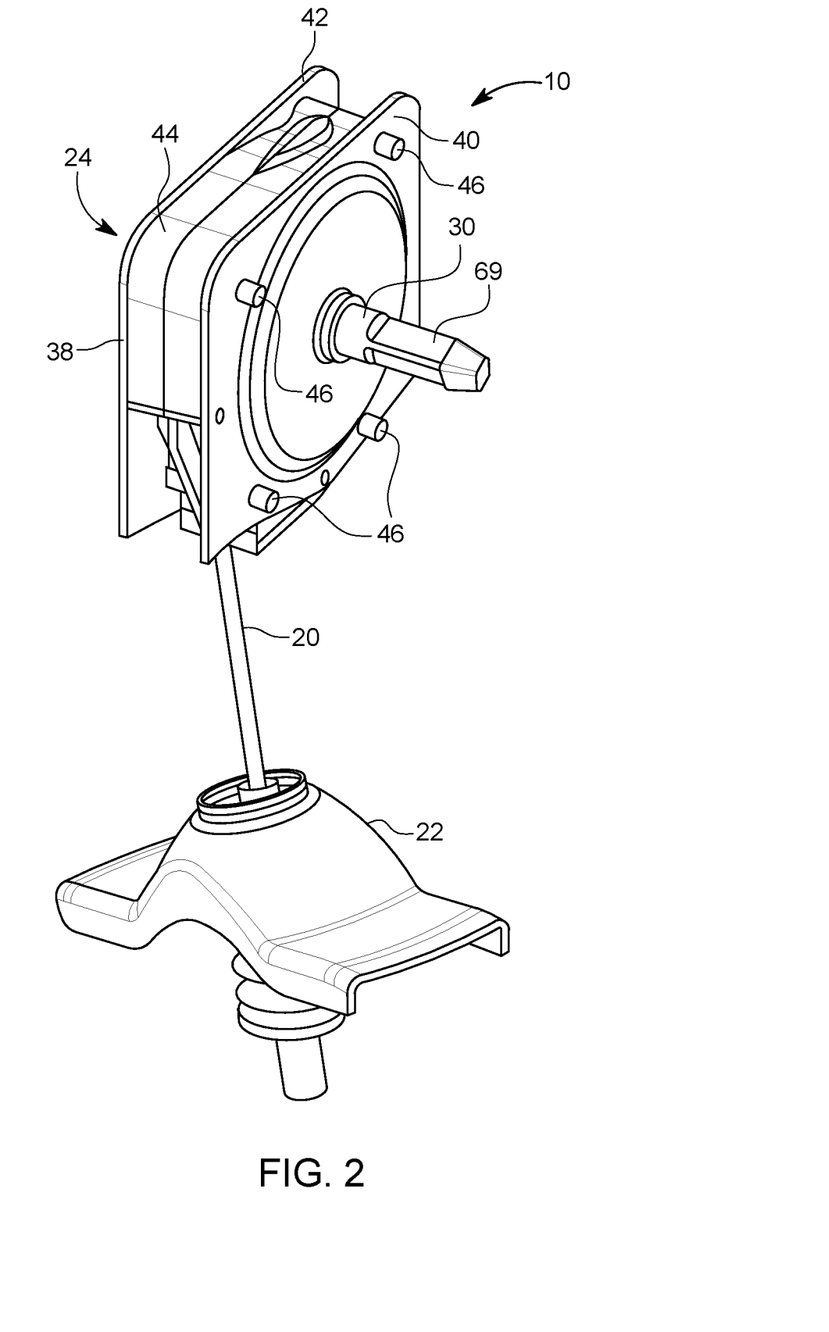
FIG. 2 is a perspective view of a prior art tire hoist system.
Figure 3:
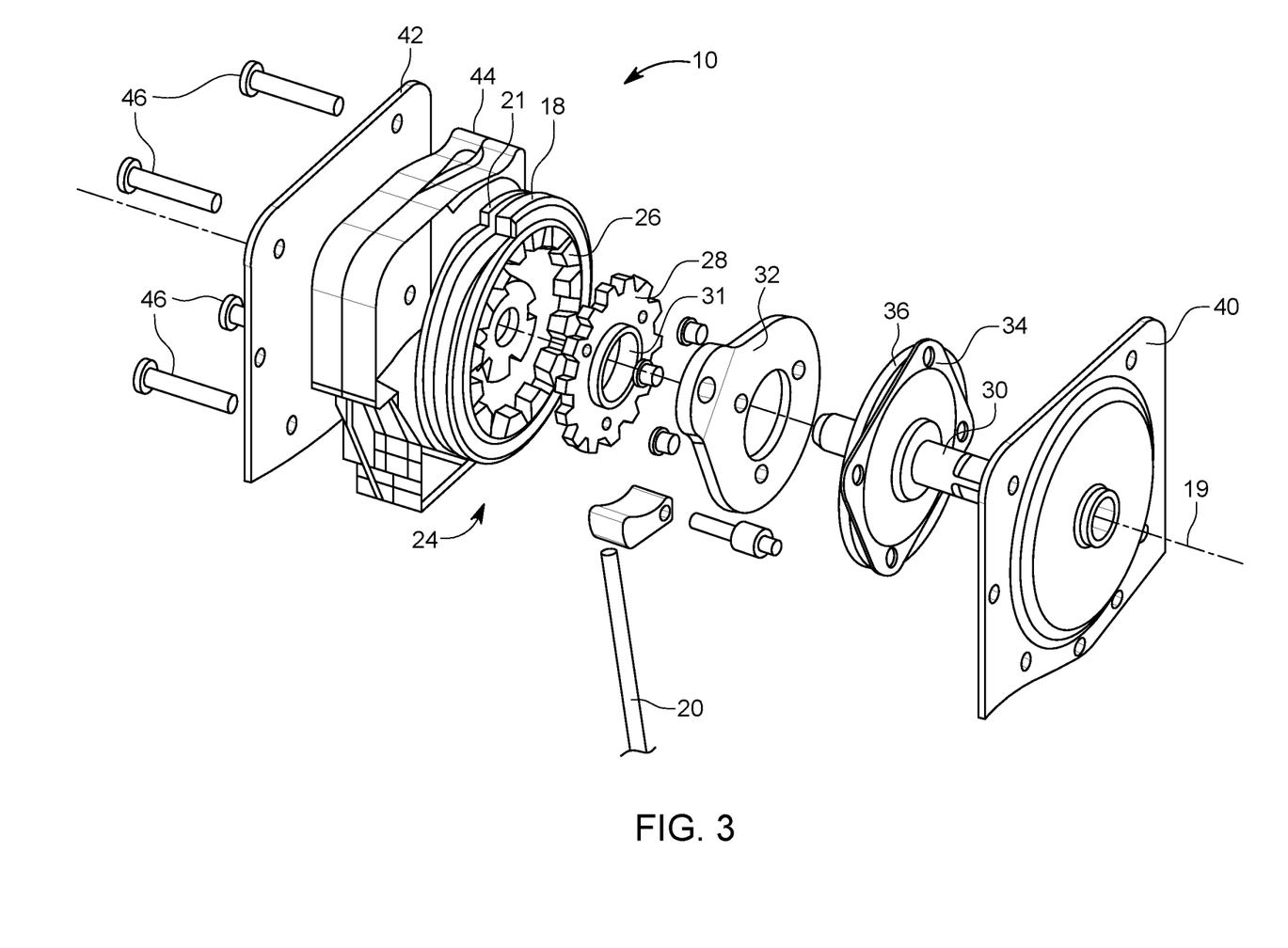
FIG. 3 is an exploded view of the tire hoist system in FIG. 2.

The present disclosure provides a tire hoist system 10 for mounting beneath a vehicle body 14 and supporting a spare tire 16 for raising and lowering. FIGS. 2 and 3 show a known tire hoist system 10, which is disclosed in further detail in U.S. Provisional Application Ser. No. 63/178,127, the entirety of which is incorporated herein. As discussed below, an input gear system 12 is added to this tire hoist system 10, and thus the basic components of the hoist system 10 are discussed. This example is non-limiting. For example, the hoist system 10 may have a different type of reduction gear system, housing, take-up reel, orientation, etc.

The tire hoist system 10 comprises: a take-up reel 18 rotatable about a reel axis 19; a flexible support member 20; and a tire support 22 coupled to a free end of the flexible support member 20 and configured to support a spare tire 16. The flexible support member 20 is coupled to the take-up reel 18 such that rotation of the take-up reel 18 in a lowering direction pays out the flexible support member 20 for lowering the spare tire 16 when supported thereon and rotation of the take-up reel 18 in a raising direction winds the flexible support member 20 onto the take-up reel 18 for raising the spare tire 16 when supported thereon.

The reel 18, flexible support member 20 and tire support 22 are well known features of tire hoist systems and need not be explained in detail. These features may be of any design and the invention is not limited to any particular design. For example, in the illustrated design the flexible support member 20 is a flexible cable, such as a metal cable, and the take-up reel 18 has a receiving slot 21 to wind the cable 20 thereon. In other embodiments, the flexible support member 20 can be a chain and the reel 18 may be designed with teeth for facilitating engagement with the chain, such as is shown for example in US Patent Publication Nos. 2014/0271067A1 and 2014/0072394A1, the entirety of which are incorporated herein by reference.

Likewise, the tire support 22 may be of any design that supports the tire 16. For example, the illustrated design has lateral wings that can be inserted generally axially in a center hole of the tire, but when the wings are oriented radially they extend to provide support surfaces for the tire 16. Similarly, a generally T-shaped member can be inserted in the center hole of the tire 16, with the cross-bar of the T being wider than the center hole diameter to act as the support surface for the tire and the vertical part of the T being connected to the free end of the flexible support member 20 (e.g., FIG. 2). Such designs can be also more complex, with support members that retract or fold for easier insertion into the tire center hole, and extend to provide support surfaces for the tire 16; or a support member or members that can be released from the flexible support member 20 to remove the tire and fixedly attached to the flexible support member 20 to secure the tire. Other designs include a cage or frame in which the tire 16 is received as the tire support member, and may extend about the exterior of the tire rather than through (or in addition to extending through) the tire center hole. Some designs include a spring between the tire 16 and the tire support member 22 to absorb shock from the tire as the vehicle drives over uneven terrain to limit the shock or jerk transferred to the flexible support member 20, which spring is included in FIG. 2. There are also designs where a secondary attachment is used, such as a secondary cable, to separately connect the tire support member to the hoist system or another part of the vehicle in the event the flexible support member or its connection to the tire support member fails. Any such features known or later designed may be used, and the present invention is not limited to any specific implementation.

The tire hoist system 10 also comprises a reduction gear system 24 coupled to the take-up reel 18. The reduction gear system 24 includes a plurality of meshed gears 26, 28 configured to travel about respective gear axes parallel or coincident with the reel axis. The illustrated example in FIG. 1 is a hypocycloidic reduction gear system where gear 26 is an outer ring gear integrated within and fixed to the inner periphery of the take-up reel 18 such that rotational driving of gear 26 in turn drives the take-up reel 18 therewith. The invention is not limited to the gears, reel or other components being separate and distinct components, and components may be separate structures or share integrated structures. In the hypocycloidic design illustrated, the outer ring gear 26 has a common axis with the take up reel 18 and is internally toothed, while the other gear 28 is offset from the outer ring gear's and is an externally toothed spur gear. The spur gear 28 moves by revolving around an axis thereof that is coincident with that of reel 18/outer gear 26 (for convenience, that shared axis may simply be referred to as the reel axis 19). As discussed in the incorporated U.S. Provisional Application Ser. No. 63/178,127, a drive shaft 30 extending inside the spur gear's central opening 31 includes an eccentric lobe (not shown) that drives the gear 28 in its travel path revolving around the reel/outer gear axis. The spur gear 28 is also mounted to a pivoting control arm 32 to control its path to maintain engagement between the intermeshed teeth of the gears 26, 28 and cause revolution of the spur gear 28 to drive the outer ring gear 26. The pivoting control arm 32 has a pivot axis spaced radially from the axis about which the spur gear 28 revolves, e.g., the reel axis 19.

It should be noted that the phrase traveling about an axis or the like is used to include both rotation or pivoting about the axis (e.g., the outer gear 26 rotates about the reel axis, and the spur gear 28 pivots about the control arm's 32 axis), and revolution about an axis (e.g., the spur gear 28 revolves about the reel axis 19).

The illustrated design also includes an optional set of clutch plates 34, 36. Clutch plate 34 is an input clutch plate fixed with the drive shaft 30. Clutch plate 36 is rotatably mounted on the drive shaft 30 and includes the eccentric lobe. Clutch plate 36 is held in firm, axial facing engagement with clutch plate 34 such that they normally rotate together with the input rotation of the drive shaft 30. However, if there an obstruction, such as the tire being caught on something when being raised, or a user applying torque in the raising direction by mistake when the tire is fully raised (e.g., instead of applying torque in the lowering direction), clutch plate 34 will slip relative to clutch plate 36 to avoid applying excessive torque to the gears and potential damage, such as tooth breakage or damage to the flexible support member 20 or its connection to the tire support member 22. Thus, clutch plate 34 will slip relative to the plate 36 when the torque applied is above a set level. In other embodiments, clutching may be provided by other means, such as a slip clutch between the outer ring gear 26 and the take-up reel 18, or there may be clutch means built into one or more of the gears, such as internal slip clutch bearings inside a gear. The invention is not limited to any particular clutching if used, and such clutching features are optional and may be omitted entirely.

The hypocycloidic reduction gear system 24 is provided solely as an example, and is not intended to be limiting. Other types of reduction gear systems that increase torque (i.e, they reduce rotational speed from the input side, thus increasing torque to increase the torsional leverage for the user) may be used. For example, the reduction gear system 24 could be a planetary gear system, an epicyclic gear system, a series or train of spur gears radially engaged with one another for rotation about parallel gear axes (e.g., with increasing radii to reduce speed and increase torque), or any other type of reduction gear system may be used. In the present design, such gear systems are also arranged to have their gear axes parallel or coincident with the reel axis. For example, as mentioned above, the gears may travel about an axis. Thus, with a planetary design where the planet gears both rotate about their own respective rotation axes and revolve about a revolution axis coincident with the sun gear axis (which may also be coincident with the reel axis 19), both types of travel are about a gear axis parallel or coincident with the reel axis. In a design where the planet carrier is fixed, the planet gears would rotate about their respective gear axes parallel to the sun gear and reel axis without revolutionary travel. In a design with a train of radially engaged spur gears, their axes would be oriented parallel with one another and the reel axis, with the output gear typically coincident with the reel axis (the output gear could be internally toothed like the illustrated design, or as other examples may be an externally toothed spur gear or an axially toothed gear connected to the reel 18). The specific details of such gear systems are well known and need not be detailed.

The plurality of meshed gears includes a reduction input gear and is configured to apply a torque to the take-up reel that is higher than a torque applied to the reduction input gear. In the illustrated embodiment, the reduction input gear is spur gear 28, and the outer ring gear 26 is the reduction output gear. The term reduction input refers to the gear or gears that receive(s) the initial application of torque input into the reduction gear system 24. In the illustrated embodiment, because the input torque is initially applied to the spur gear 28, that is considered the reduction input gear, and because the torque is ultimately transferred to the outer ring gear 26 that is considered the reduction output gear. In other embodiments, what constitutes the reduction input and output gears may vary. For example, in a series of radially intermeshed spur gears, the input reduction is the first gear in the series that initially receives the torque from the user (and typically has the smallest radius), while the output reduction gear is the last gear in the series that ultimately has the highest torque and is connected to the take-up reel 18. Similarly, in a planetary gear system with a fixed outer ring, a central spur gear (i.e., a sun gear) may be driven as the reduction input gear and the planet spur gears rotating about the sun gear may collectively be considered a reduction output gear because they are mounted to a planet carrier to which they transfer higher torque. Likewise, in a planetary gear system with a fixed planet carrier (which some may call epicyclic, but not planetary because the planet gears are not orbiting), the central (sun) gear would again be the reduction input gear and the outer ring gear rotates to serve as the reduction output gear, while the planet gears rotate as intermediate gears therebetween. Again, the particular reduction gear system used is not limiting, and the terms reduction input gear and reduction output gear are not limited to any specific type of gear, and simply serve to identify the gear receiving the initial input torque and the gear outputting the ultimate output torque that is applied to the take up reel.

The illustrated embodiment of the hoist system 10 includes a housing 38 for the reduction gear system 24. The housing 38 illustrated includes two face plates 40, 42, which are perpendicular to the reel axis 19, and a peripherally extending wall 44 that extends between the plates 40, 42 and around the periphery therebetween. The wall 44 has an outlet for the flexible support member 20 (the cable), and the face plates 40, 42 are secured together by fasteners 46, which may be any suitable fasteners, such as bolts, screws, rivets, clamps, staking, etc.

Figure 4:
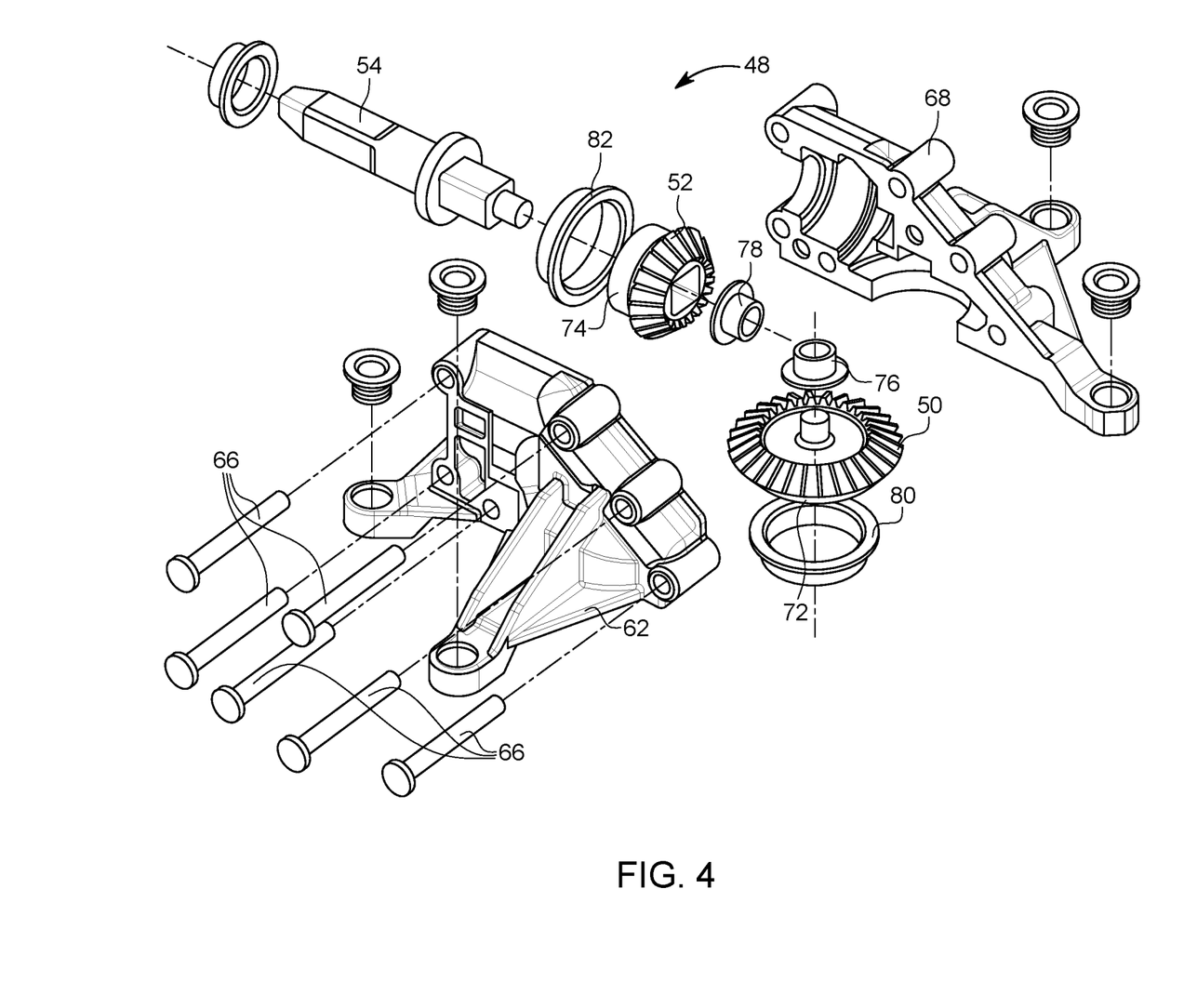
FIG. 4 is an exploded view of an input gear system.
Figure 5:
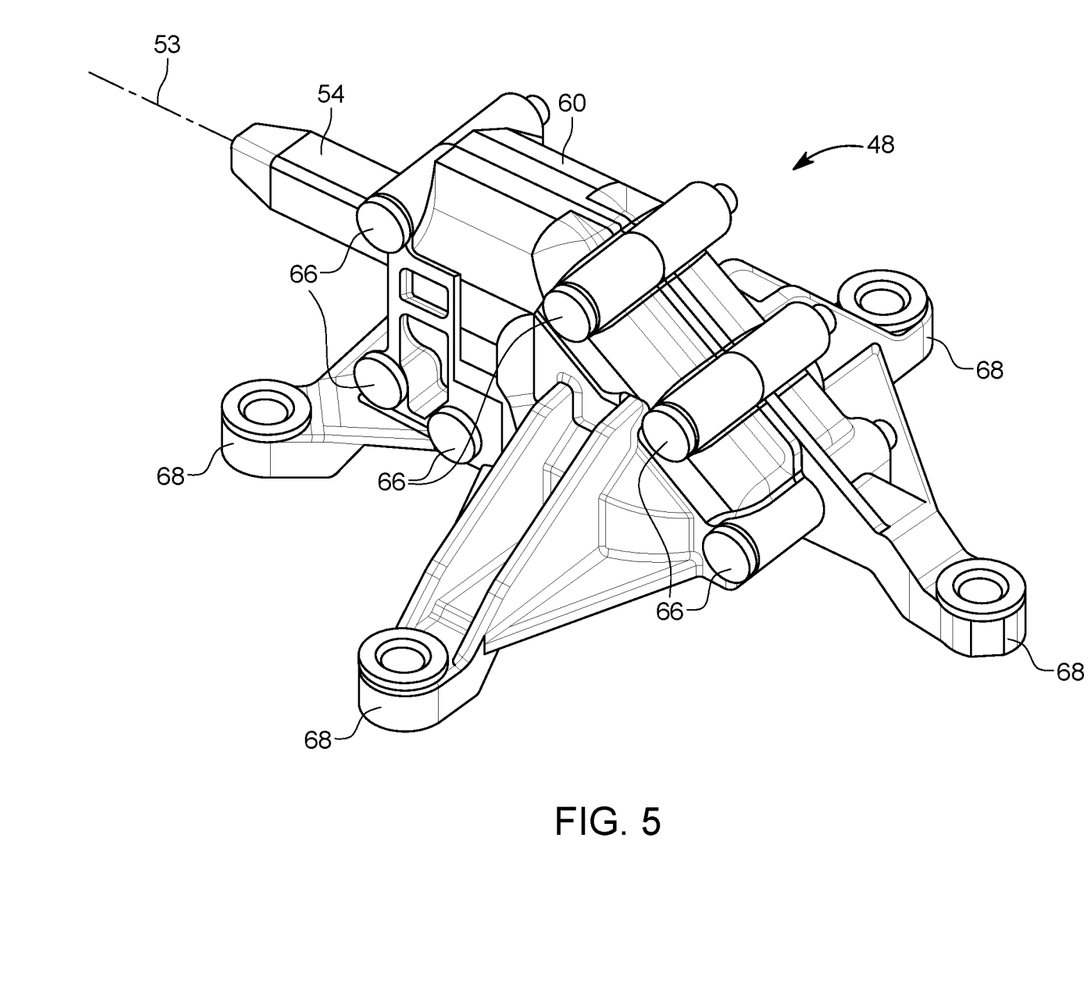
FIG. 5 is a perspective of view of the input gear system in FIG. 4 assembled.

The tire hoist system 10 also comprises an input gear system 48. The term input gear system refers to a system that has gears for transferring or inputting torque from the user-driven tool to the reduction input gear of the reduction gear system 24. The input gear system 48 may provide some gear reduction (i.e., torque increase), but that is optional and it may have a 1:1 gear ratio instead. As will be discussed herein, the input gear system 48 is designed to enable the tool 58 with which the driver applies torque to the reduction gear system to be oriented at an angle to the reel axis 19 of the system 10. Thus, the input gear system 48 may in some embodiments also be referred to as an angle gearbox or converter. In the illustrated embodiment, the angle is 90 degrees, i.e., the angle of an input axis for the input gear system 48 is perpendicular to the reel axis, although as will be discussed below other orientations/angles are possible as well.

The input gear system 48 has an output gear 50 coupled to the reduction input gear 28 of the reduction gear system 24 such that rotation of the output gear 50 drives the reduction input gear 28 (which in turn rotates the output reduction gear 26 and the reel 28 to take-up or pay out the flexible support member 20). In the illustrated embodiment, the coupling between the output gear 50 and the reduction input gear 28 is by the output gear 50 being rotatably fixed to the end of the drive shaft 30, which in turn is clutched to the reduction input gear 28 by the clutch plates 34, 36 for the clutch plate 36 to rotate the eccentric lobe to drive the reduction input gear 28. That is, the output gear 50 is fixed to the end of the drive shaft such that they are fixed together for rotation. Thus, the output gear 50 may be coupled indirectly to the reduction input gear 28, and coupling broadly means any direct or indirect connection (in this context for transferring torque), and is not limited to any specific arrangement. For example, in designs with clutching omitted, the coupling may be through the driveshaft 30 with an eccentric lobe thereon (or for other reduction gear system designs the driveshaft 30 may directly drive a coaxial gear, like a central sun gear, a first spur gear in a train, etc.).

The input gear system 48 also includes a driving input gear 52 meshed with the output gear 50 such that rotation thereof drives the output gear 50. An input element 54 is fixed with the driving input gear and engageable by the drive tool 58 (typically by its socket) for rotating the driving input gear 52 of the input gear system 48. While the output gear 50 is rotated about an output axis parallel to or coincident with the reel axis, the input element 54 and the driving input gear 52 are rotatable about an input axis 53 oriented at an angle to the reel axis 19.

In this context, at an angle means the input axis is not parallel to or coincident with the reel axis 19. The input axis does not need to intersect with the reel axis for it to be at an angle. For example, it is sufficient that the input axis be skewed relative to the reel axis (e.g., the reel axis and the input axis may lie in parallel planes, and the input axis extending at a different angle in its respective plane would still be considered an input axis at an angle). The angle could be on the horizontal plane, the vertical plane, or a combination of both (i.e., an angle defined by vectors in each plane). Further, the specific amount of the angle is not limited, and in the illustrated embodiment it is at 90 degrees to the reel axis 19.

Figure 6:
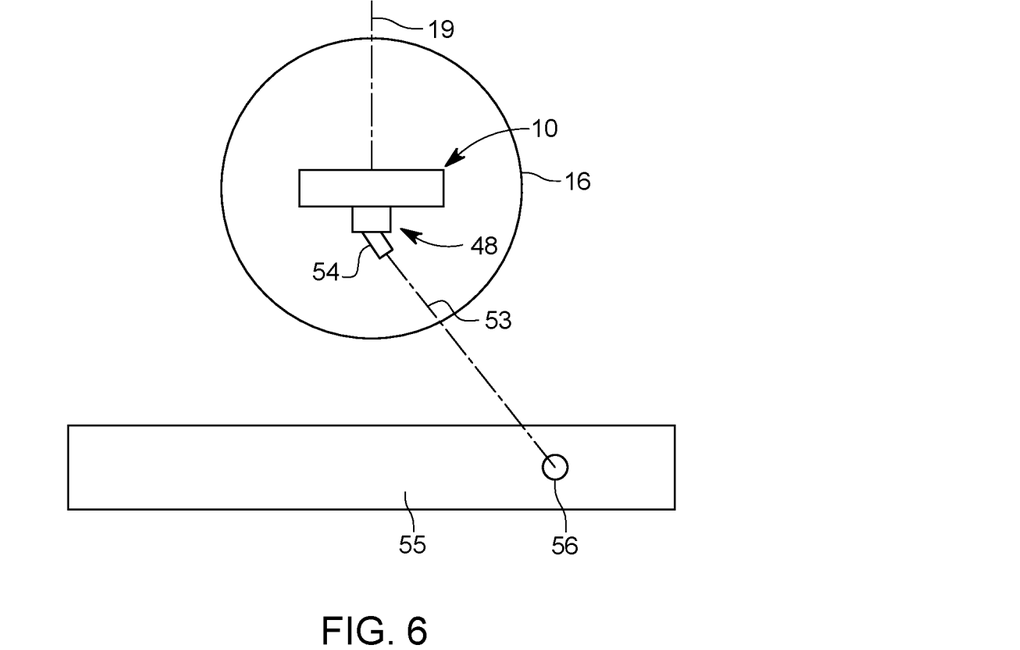
FIG. 6 is a top schematic view of one arrangement of vehicle components having a hoist system therein to show the general relationship between such components.

Angling the input axis 53 provides numerous advantages in a wide variety of contexts. For example, the orientation in FIG. 1 shows an example of one context. As discussed previously, in the arrangement shown, the vehicle body 14 comprises the rear bumper 55 mounted to the vehicle body, and the rear bumper 55 may optionally comprise the access opening 56 for the drive tool 58, while the tire hoist system is spaced forwardly of the rear bumper 55. The access opening 56 for the drive tool 58 is also laterally offset from the tire location in the vehicle, and thus the tool 58 is inserted with its longitudinal direction extending at an angle with respect to the front-back axis of the vehicle. The typical reason for such an arrangement is that there is some vehicle component or other design constraint that precludes the access opening 56 for the tool 58 and the tire hoist system from being aligned in the vehicle front-back direction. In FIG. 1, the hoist system is turned at an angle of approximately 30 degrees relative to the vehicle front-back direction such that the reel axis 19, along with axes of the drive shaft 32, output reduction gear 26, etc., are aligned with the access opening 56 for the drive tool 58. This creates the problem, however, of the hoist system itself having a larger effective packaging envelope inside the vehicle, because the angling thereof requires more clearance in the front-back direction than if the reel axis 19 were aligned in the front-back direction. In contrast, with the input gear system 48 used in the present invention, the hoist system 10 can have its reel axis 19 oriented in the front-back direction of the vehicle, while the input axis 53 and input element 54 can be oriented at the same approximately 30 degrees shown in FIG. 1 for alignment with the access opening 56 for the drive tool 58 (also called the tool path), thereby accommodating the packaging constraint requiring the hoist system and the access opening 56 to be laterally offset while allowing the hoist system to keep its thinner profile in the vehicle front-back direction. FIG. 6 is a schematic showing this relationship (with the structural details omitted).

Another context that arises is the situation where the hoist system cannot be oriented at an angle like in FIG. 1 because of space constraints, but the tire has to be in the same location and a tool path in the front-to-back direction of the vehicle is unavailable. This situation typically requires the hoist system to be spaced apart from the tire location in the vehicle lateral direction with the tool path and the access opening 56 also typically located laterally relative from the tire location so the tool 58 is inserted in the front-back direction (and also parallel to or coincident with the reel axis). By tool path, this term refers to the path the tool 58 follows when the user inserts through the access opening and connects it to the hoist system input. A tool path may include a tube or the like for facilitating guidance as discussed previously, or it may be an open space through which the tool travels, or a combination of both (i.e., a tube that extends partially, such as from the access opening, to facilitate alignment). In this situation, a remote design is used in the prior art, in which a guide or routing system (such as an elbowed tube, or any other guide feature) is used to guide or route the flexible support member 20 laterally over to the location of the tire so it can extend vertically downward for connection to the tire. Such systems are less desirable because the guide or routing system introduces additional cost, additional assembly steps, and introduces additional friction into the system. In contrast, with the input gear system 48 of the present invention, the hoist system 10 can have its reel axis 19 oriented in the front-back direction of the vehicle and remain over the tire location to avoid the need for any lateral guiding/routing because the input axis 53 and input element 54 can be oriented at an angle, e.g., the same appx. 30 degrees shown in FIG. 1 (and FIG. 6), for engagement with the tool 58 angled relative to the vehicle front-back direction when inserted through access opening 56, as mentioned previously.

Figure 7:
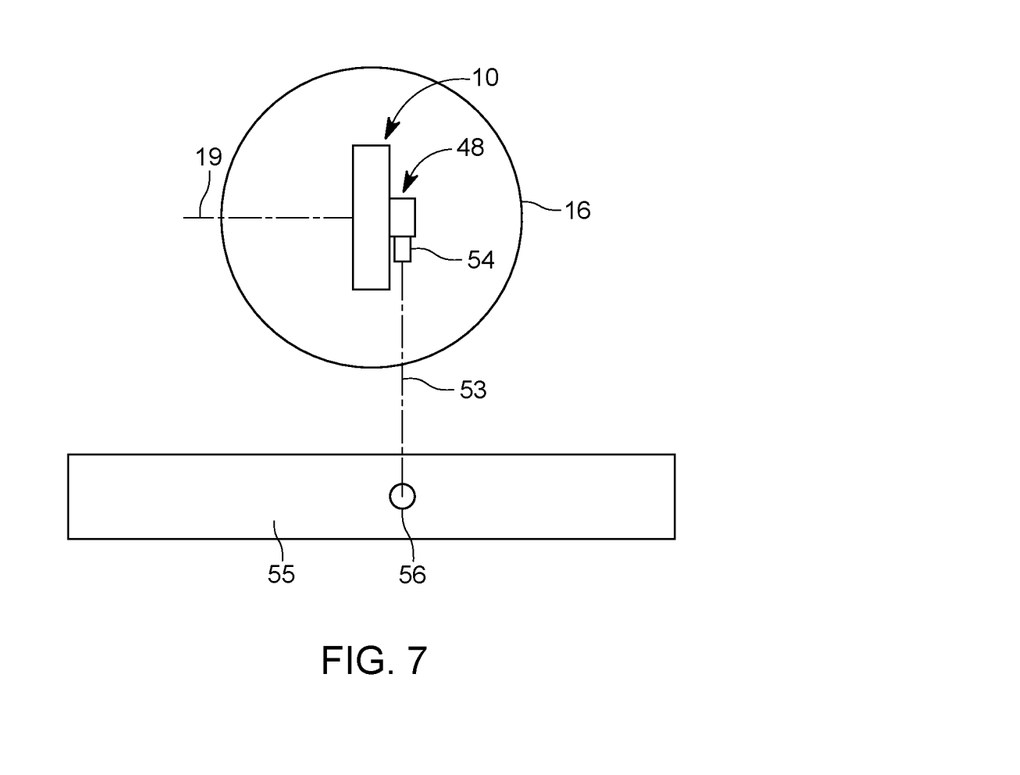
FIG. 7 is a top schematic view of another arrangement of vehicle components having a hoist system therein to show the general relationship between such components.

Another advantage is that the input gear system 48 of the present invention can be used to enable the hoist system to have its reel axis 19 oriented laterally with respect to the vehicle, so that it has a lower profile in the lateral direction of the vehicle, while still allowing the tool 58 to be introduced from the bumper 55 so as to extend in the front-back direction. This may be done with a front-back oriented input axis 53 that is approximately 90 degrees to the reel axis 19, which is shown schematically in FIG. 7 (structural details omitted). However, the input axis 53 may also be at an angle to the front-back direction for an angled tool path relative to the vehicle front-back direction similar to the approach discussed above in FIG. 6 (except with the reel axis oriented laterally).

Another advantage is that the input gear system 48 of the present invention can be used to enable the hoist system to be oriented vertically with respect to the vehicle so that it has a lower profile in the height direction of the vehicle while the drive tool 58 extends forwardly from the access opening 56 on the bumper 55 or other rear structure. That is, the reel and gear axes are oriented vertically. A guide or routing feature may be included to guide or route the flexible support member 20 to transition it from being paid out/taken up in the horizontal plane to extending vertically to support the tire 16 in such an approach. This may be desirable for space constraint reasons, or for vehicles that may drive off-road where more ground clearance is desirable. In one such embodiment, the input axis 53, and hence the input element 54, is oriented horizontally, and thus is perpendicular to the vertical direction and the axis 19. In another such embodiment, the input axis 53 may be non-perpendicular to the reel axis 19 and at an angle to horizontal. This arrangement allows for a tool path where the input element 54 and the access opening 56 are at different heights on the vehicle, such that the drive tool 58 extends from the opening 56 to the input element 54 at an angle relative to horizontal (as well as at an angle to the reel axis). It is envisioned such an angle to horizontal would be relatively small, and on the order of 5-15 degrees, although the exact angle depends on the vehicle design. Either the horizontal or the non-horizontal input axis may be aligned with the front-rear direction of the car, or it may be an angle to the front-rear direction (like FIG. 1).

Figure 8:
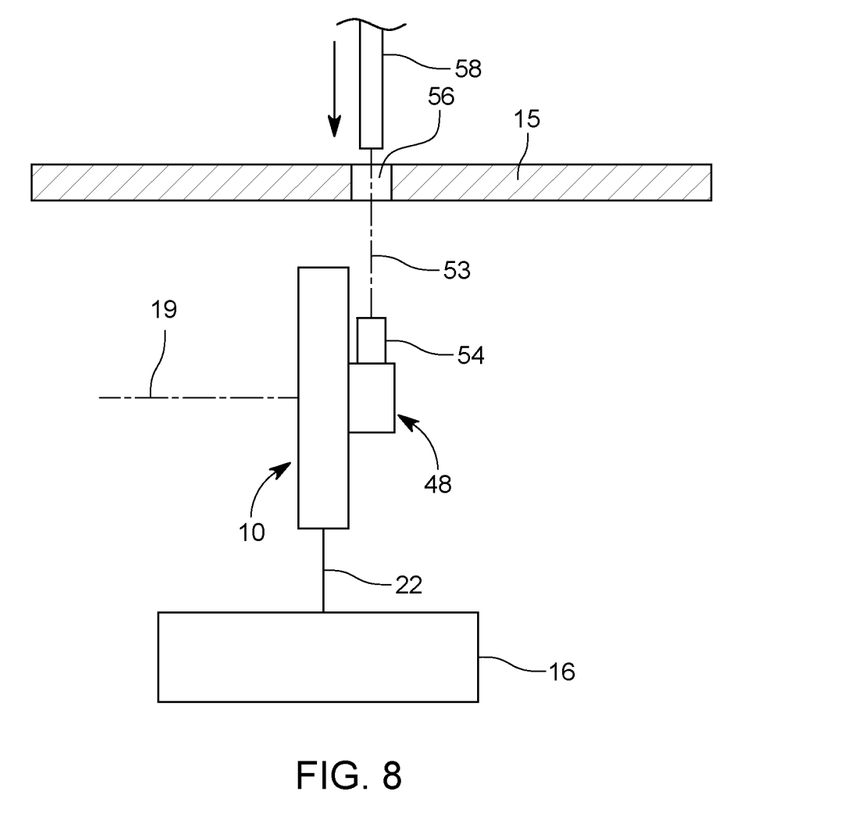
FIG. 8 is a side schematic view of another arrangement of vehicle components having a hoist system therein to show the general relationship between such components.

Other advantages can arise in the context of a vehicle where the access opening 56 for the tool 58 is included in the passenger compartment floor of the vehicle body. In these designs, typically the access opening 56 is hidden under a carpet, floor mat or other covering in the vehicle passenger compartment, and the user pulls that back and inserts the drive tool 58 downward vertically to engage the input 69 of the hoist system, and the hoist system is also oriented vertically so that its drive input element 69 is oriented vertically and its reel axis 19 is also. This enables the drive input to be engaged by the drive tool by being oriented along a vertical tool path. This, however, constrains the hoist system to be arranged in this orientation, which takes up more room in the lateral and front-back directions of the vehicle as compared to the orientation where its reel axis 19 is oriented front to back, which may create an issue with other vehicle space constraints. This hoist system orientation also requires some type of routing or guide feature for the flexible support member to transition it from being paid out/taken up in the horizontal plane to extending vertically to support the spare tire. Although the orientation may be advantageous where ground clearance is desirable as mentioned above, that may be less of an issue with many vehicles and in some vehicles space constraints are more of a concern (particularly smaller cars, where space is more of an issue, in contrast to trucks where ground clearance may be more of a concern for rough terrain driving and space is less of an issue). With the input gear system 48 of the present invention, the hoist system 10 can be installed in the same orientation traditionally used for vehicles where the tool 58 is delivered in the front-back direction, such as from the rear bumper 55, i.e., the hoist system can be oriented with its reel axis 19 oriented horizontally, such as in the front-back direction of the vehicle, but its input element 54 and input axis 53 oriented vertically so it can be access from the passenger compartment. This is shown schematically in FIG. 8 (structural details omitted), with 15 representing the passenger compartment floor. Likewise, the reel axis 19 can be oriented horizontally in the lateral direction of the vehicle, or in any non-vertical direction as desired to provide for increased space constraint flexibility.

Figure 9A:
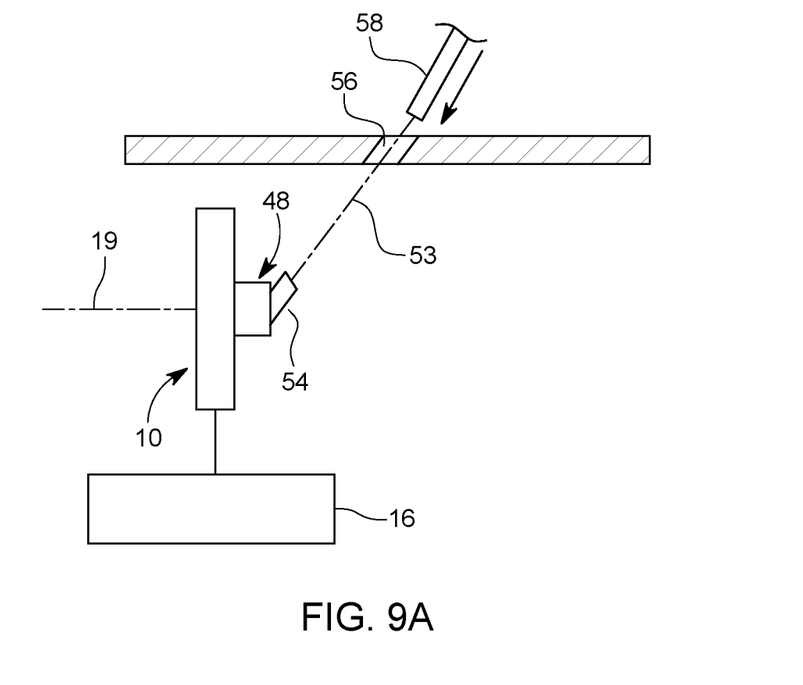
FIG. 9a is a side schematic view of another arrangement of vehicle components having a hoist system therein to show the general relationship between such components.
Figure 9B:
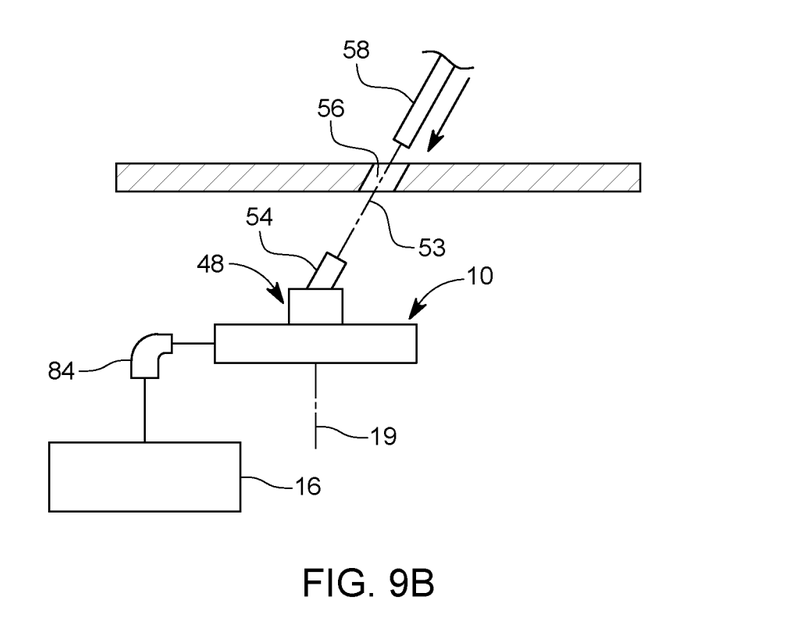
FIG. 9b is a side schematic view of another arrangement of vehicle components having a hoist system therein to show the general relationship between such components.

The input gear system 48 also provides an alternative or additional advantage for designs where the access opening is included in the passenger compartment floor 15 of the vehicle body. With the angling, the tire can be located in spaced relation in the horizontal vehicle plane (i.e., offset in the front-back or lateral direction, or both). This enables the tire to be located under what would normally be considered an undesirable location, such as a vehicle seat. A vehicle seat is an example of an undesirable location because if the user has to raise or remove a vehicle seat to expose the access opening 56 that is a significant inconvenience. Angling the input axis 53 and element 54 avoids this constraint, as it does not require a vertical relation between the access opening 56 and the input element 54 on the hoist system 10 engaged by the tool 58. In such designs where the access opening 56 and hoist system 10 are offset horizontally from one another, the hoist system 10 may have its reel axis 19 oriented vertically with a guide or routing feature 84 for transitioning the flexible support member 20 to a vertical orientation (schematically represented in FIG. 9A). However, the angling of the input element 54 also provides the freedom for the hoist system 10 to have any other orientation, including for example those mentioned above where the reel axis 19 is oriented horizontally (schematically represented in FIG. 9B). Because the hoist system 10 and access opening 56 are offset horizontally, the input element 54 may be oriented in alignment with the access opening 56 such that the angle of the input axis 53 is non-perpendicular to the reel axis 19 and also at an angle to vertical.

In each of these embodiments, the input axis 53 of the input gear system's input element 54 is oriented to align with the access opening 56 on the vehicle body for facilitating engagement with the elongated drive tool 58 when inserted through the access opening 56. Due to the angling of the input axis 53 with respect to the reel axis 19, this enables a wide degree of design and space management freedom in the vehicle, as many more orientations and packaging arrangements for the tire hoist system 10, tire 16 and the access opening 56 and the associated path 54 for the drive tool 58. The arrangements mentioned herein are just examples, and not intended to be limited.

In the illustrated embodiment, the input gear system 48 comprises an input gear system housing 60 in which the driving input and output gears 50, 52 thereof are rotatably mounted. In the illustrated design, this housing 60 is designed as a separate component that is mounted to an exterior surface of the reduction gear housing 38 of the reduction gear system 24, and specifically the face plate 40 thereof. The housing is designed with a first part 62 and a second part 64 that are secured together by fasteners 66, such as by bolts, rivets, adhesive, welded joints, staking, etc. The housing 60 in the illustrated embodiment has a mount structure in the form of four legs or flanges 68 extending therefrom that are secured to the housing 38 of the reduction gear system 24, in particular the face plate 40 thereof, by fasteners 70, which may be any of fastening similar to the other fasteners mentioned above. Any type of mount structure for mounting the housing 60, and thus the input gear system 48, to the reduction gear housing 38 may be used, and the four point structure is not limiting. The interior of the housing 60 may be sealed in any suitable manner, and may contain an optional lubricant to keep the gears 50, 52 therein lubricated.

A separate housing has the advantages of creating an input gear system 48 that can be applied to pre-existing or off-the-shelf tire hoist system to convert into one where the input axis 53 is at an angle to the reel axis 19, rather than parallel or coincident with it. By pre-existing or off-the-shelf, this refers to a hoist system that is completed and has its own input element 69 that can be engaged by the driving tool 58. The separate housing 60 including the input gear system 48 enables it to be converted to the type disclosed herein in which the input axis 53 is at angle to the reel axis 19. Specifically, the output side of the output gear 50 has an opening or socket that couples to the input element 69 on the reduction gear system 24 in the same manner as the driving tool's 58 socket would, and the adapter system 48 orients its own input element 54 so that its input axis 53 is at the desired angle. This may be desirable to an OEM that has a satisfactory tire hoist system, but wants more installation flexibility without having to make any significant changes to system or its manufacturing tooling or processes. This is particularly advantageous in the vehicle design process, as there are numerous components on the underside of a vehicle and hence numerous space constraints that compete with one another. Such a design may allow the OEM to settle on the basic mechanics of the hoist system, and particularly the reduction gear system 24 and reel 18, while maintaining flexibility on the input axis 53 as needed to address competing space constraints. Hence, pre-existing or off-the shelf is not limited to situations where the OEM had already been purchasing the tire hoist system without the input gear system 48, and can include situations where the basic hoist system parts (e.g., the reel 18, the reduction gear system 24, the flexible support member 20 and the tire support 22) is designed or manufactured separately from the input gear system 48 and the input gear system 48 is added on to it. Such an input gear system 48 included in its own housing 60 may be referred to as an adapter input gear system, as when mounted to the reduction gear system 24 and connects to its input element 69 it adapts the hoist system from having the reel axis and input element/input axis in one direction to a system with the input element 54 and its axis 53 oriented at an angle to the reel axis 19.

The input gear system 48 as an adapter also has the advantage that it may have a gear ratio different from 1:1, which may be tailored for use with a hoist system with its own gear ratio, such that the entire system has an desired overall reduction ratio. That allows the reduction gear system 24 to remain the same without needing to re-design the gear system inside, as the ratio in the input gear system 48 can be used to increase or decrease the overall gear ratio of the hoist system 10.

In the illustrated embodiment, each of the driving input and output gears 50, 52 of the input gear system 48 are bevel gears each with a plurality of angled teeth that intermesh with one another. Each bevel gear 50, 52 is fixed on a shaft 72, 74 rotatably supported on a wall of the housing 60, such as in a bore or journal. The bevel gears 50, 52 also each have a set of bearings 76/80 and 78/82, also rotatably supported on the wall of the housing 60, such as in bores or journals. Each bevel gear 50, 52 is thus rotatably supported by its associated shaft 72, 74 and bearings 76/80, 76/82 for rotation about its respective axis. The disclosed embodiment is exemplary only, and is not intended to be limiting. Bevel gears (or any other gears used) may be rotatably supported in any manner, such as having a shaft extending therethrough for rotational support at each end, having integral shafts or bearings projecting from each end, or the like.

In the illustrated embodiment, the driving input gear 52 of the input gear system 48 is oriented such that the input axis 53 is oriented perpendicularly to the reel axis 19. This is accomplished by the angled teeth of the two bevel gears complementing such that the axis of the output gear 50 is oriented in the same direction as the reel axis 19, and the axis of the input gear 52 is oriented perpendicularly thereto. Other angles may be selected by changing the respective angles of the bevels. Other angles can be achieved by modifying one or both bevel angles to achieve the desired angle.

Thus, the invention also includes adapting a tire hoist system by providing the adapter input gear system 48, which has (a) an output gear 50 for coupling to the reduction input gear 28 of the reduction gear system 24 such that rotation of the output gear 50 drives the reduction input gear 28, (b) the driving input gear 52 meshed with the output gear 50 such that rotation thereof drives the output gear 50, (c) the input element 54 fixed with the driving input gear 52 and engageable by the drive tool 58 for rotating the driving input gear 52, and (d) the input gear system housing 60. The output gear 50 is rotatable about its output axis in that housing 60 and the input element 54 and the driving input gear 52 are rotatable about their input axis oriented at an angle to the output axis (which will be coincident with the reel axis 19 when the adapter system 48 is attached). The method further include mounting the input gear system housing 60 to an exterior surface of the reduction gear system housing 38 to couple the output gear 50 to the reduction input gear 28 such that the output axis of the output gear 50 is parallel or coincident with the reel axis 19, and the input axis of the input element 54 and the driving input gear 52 are oriented at the angle to the reel axis 19, as discussed above.

As mentioned, the reduction gear system 24 includes an input element 69 coupled to the reduction input gear 28 such that rotation of the input element 69 rotates the reduction input gear 28, and the output gear 50 of the adapter input gear system 48 includes the socket that receives the input element 69 for coupling the output gear 50 to the reduction input gear 28.

Other gear arrangements for transmitting rotary motion between gears having angled axes may be used, including but not limited to helical, crowned or hypoid gears. The illustrated use of bevel gears is exemplary only and not intended to be limiting.

The components discussed herein may be made of any material, such as metal, including stamped, forged, die-cast, powdered metal, etc., plastics, or composites. No particular material is regarded as limiting.

When terms such as vertical or horizontal are used herein to indicate direction, those should be understood as being made with reference to the vehicle assuming it is upright on level ground. Those terms can be used interchangeably with vehicle directions, such as the height direction of the vehicle being the same as vertical and the lateral and front-back directions being the same as horizontal. Moreover, when the terms horizontal, vertical, parallel, perpendicular, aligned, coincident or the like are used, they should be included as allowing for minor imperfections and variations, and the scope of such terms does not require absolute perfection, which is consistent with how a person ordinary skill in the art would understand those terms. Stated differently, such terms may be understood as having the "essentially" included therein to allow for such minor imperfections, which is similar to the manner in which the patent term "consisting essentially of" allows for substances that do not materially affect the claimed invention because minor deviations from these directions that do not materially affect the construction or operation of the claimed invention.

The foregoing illustrated embodiment has been provided to illustrate the structural and functional principles of the present invention and is not intended to be limiting. To the contrary, the principles of the present invention are intended to encompass any and all changes, alterations and/or substitutions within the spirit and scope of the following claims.

What is claimed:

1. A tire hoist system for mounting beneath a vehicle body and supporting a spare tire for raising and lowering, the tire hoist system comprising:
   a take-up reel rotatable about a reel axis;
   a flexible support member;
   a tire support coupled to a free end of the flexible support member and configured to support a spare tire;
   the flexible support member being coupled to the take-up reel such that rotation of the take-up reel in a lowering direction pays out the flexible support member for lowering the spare tire when supported thereon and rotation of the take-up reel in a raising direction winds the flexible support member onto the take-up reel for raising the spare tire when supported thereon;
   a reduction gear system coupled to the take-up reel, the reduction gear system including a plurality of meshed gears, the plurality of meshed gears including a reduction input gear and being configured to apply a torque to the take-up reel that is higher than a torque applied to the reduction input gear;
   an input gear system having (a) an output gear coupled to the reduction input gear of the reduction gear system such that rotation of the output gear drives the reduction input gear, (b) a driving input gear meshed with the output gear such that rotation thereof drives the output gear, and (c) an input element fixed with the driving input gear and engageable by a drive tool for rotating the driving input gear of the input gear system, the output gear being rotated about an output axis parallel or coincident with the reel axis and the input element and the driving input gear being rotatable about an input axis oriented at an angle to the reel axis;
   wherein the reduction gear system includes a reduction gear system housing and the input gear system is an adapter input gear system comprising an input gear system housing in which the driving input and output gears thereof are rotatably mounted, the input gear system being assembled separately from the reduction gear system and mounted by the input gear system housing being mounted to an exterior surface of the reduction gear system housing.

2. The tire hoist system of claim 1, wherein the driving input and output gears of the input gear system are bevel gears.

3. The tire hoist system of claim 1, wherein the driving input gear of the input gear system is oriented such that the input axis is oriented perpendicularly to the reel axis.

4. The tire hoist system of claim 3, wherein the driving input and output gears of the input gear system are bevel gears.

5. The tire hoist system of claim 1, wherein the input gear system housing contains a lubricant for the driving input and output gears.

6. The tire hoist system of claim 4, wherein the input gear system housing contains a lubricant for the driving input and output gears.

7. The tire hoist system of claim 1, where the plurality of gears of the reduction gear system are configured to travel about respective gear axes parallel or coincident with the reel axis.

8. The tire hoist system of claim 3, where the plurality of gears of the reduction gear system are configured to travel about respective gear axes parallel or coincident with the reel axis.

9. The tire hoist system of claim 4, where the plurality of gears of the reduction gear system are configured to travel about respective gear axes parallel or coincident with the reel axis.

10. A method of adapting a tire hoist system for mounting beneath a vehicle body and supporting a spare tire for raising and lowering, the tire hoist system comprising:
    a take-up reel rotatable about a reel axis;
    a flexible support member;
    a tire support coupled to a free end of the flexible support member and configured to support a spare tire;
    the flexible support member being coupled to the take-up reel such that rotation of the take-up reel in a lowering direction pays out the flexible support member for lowering the spare tire when supported thereon and rotation of the take-up reel in a raising direction winds the flexible support member onto the take-up reel for raising the spare tire when supported thereon;
    a reduction gear system coupled to the take-up reel, the reduction gear system including a plurality of meshed gears, the plurality of meshed gears including a reduction input gear and being configured to apply a torque to the take-up reel that is higher than a torque applied to the reduction input gear, wherein the reduction gear system includes a reduction gear system housing;
    wherein the method comprises:
    providing an adapter input gear system having (a) an output gear for coupling to the reduction input gear of the reduction gear system such that rotation of the output gear drives the reduction input gear, (b) a driving input gear meshed with the output gear such that rotation thereof drives the output gear, (c) an input element fixed with the driving input gear and engageable by a drive tool for rotating the driving input gear of the input gear system, and (d) an input gear system housing in which the driving input and output gears thereof are rotatably mounted, wherein the output gear is rotatable about an output axis and the input element and the driving input gear are rotatable about an input axis oriented at an angle to the output axis; and mounting the input gear system housing to an exterior surface of the reduction gear system housing to couple the output gear to the reduction input gear such that the output axis of the output gear is parallel or coincident with the reel axis and the input axis of the input element and the driving input gear are oriented at the angle to the reel axis.

11. The method of claim 10, wherein the reduction gear system includes an input element coupled to the reduction input gear such that rotation of the input element rotates the reduction input gear, and the output gear of the adapter input gear system includes a socket that receives the input element of the reduction gear system for coupling the output gear to the reduction input gear.

\* \* \* \* \*